Figure 1:
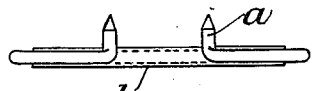

Feb. 27, 1923.
S. C. DAVIDSON.
TREATMENT OF RAW RUBBER AND THE LIKE PLASTIC SUBSTANCES.
FILED JAN. 6, 1922.
1,446,737.
2 SHEETS—SHEET 1.

Inventor:
Frederick George Maguire, Alfred Agar, and Hugh Taylor Coulter, Executors of Samuel Cleland Davidson, deceased
By Attorneys Fraser Turk & Myers Feb. 27, 1923.
S. C. DAVIDSON.
TREATMENT OF RAW RUBBER AND THE LIKE PLASTIC SUBSTANCES.
FILED JAN. 6, 1922.

1,446,737.

Patented Feb. 27, 1923.

1,446,737

UNITED STATES PATENT OFFICE.

SAMUEL CLELAND DAVIDSON, DECEASED, LATE OF BELFAST, IRELAND, BY FREDERICK GEORGE MAGUIRE, OF BANGOR, IRELAND, ALFRED AGAR, OF HOLYWOOD, IRELAND, AND HUGH TAYLOR COULTER, OF BELFAST, IRELAND, EXECUTORS.

TREATMENT OF RAW RUBBER AND THE LIKE PLASTIC SUBSTANCES.

Application filed January 6, 1922. Serial No. 527,486.

*To all whom it may concern:*

Be it known that Sir SAMUEL CLELAND DAVIDSON, K. B. E., deceased, late of Sirocco Engineering Works, Belfast, Ireland, a subject of the King of Great Britain and Ireland, did invent certain new and useful Improvements in and Relating to the Treatment of Raw Rubber and the like Plastic Substances, of which the following is a specification.

This invention relates to the treatment of raw rubber, that is to say, to rubber which has not yet undergone any vulcanizing treatment, and is applicable also to the treatment of other substances of a like plastic nature.

In the treatment of raw rubber freshly coagulated from the latex, in order to bring the coagulum into a condition suitable for keeping, or for despatch to the market, or for passing to the vulcanizers, it has heretofore been proposed to roll the coagulum under pressure between the rollers of massaging or kneading machines such as those described in Patent No. 1,256,664, Feb. 19, 1918.

This treatment has the effect of reducing the coagulum to the form of a solid roll more or less elongated according to the length of the rollers employed, the mass of the coagulum of raw rubber treated in the massaging and kneading operation, and the pressure to which the said coagulum is subjected; but when the pressure of said massaging rollers is released the elongated roll or bar of raw rubber at once contracts very considerably in length and increases in diameter while still containing an amount of uncombined water which it is desirable to extract therefrom.

It is well understood by experts in the treatment of raw rubber that there is a difficulty in getting rid quickly and to an adequate extent, of the uncombined water present in raw rubber which has been freshly coagulated from the liquid latex. In Patent No. 1,388,453, Aug. 23, 1921, one method of mechanically dehydrating raw rubber has already been described, the said method being more particularly suitable for application prior to the sheeting stage of treatment of the rubber coagulum.

The present invention is not to be regarded as an improvement upon the said former invention but as consisting in a further and a different method of mechanically dehydrating a mass of raw rubber and suitable for employment at a different stage of the manufacturing treatment of the rubber relatively to the said former invention, the desirability being well understood of relieving the raw rubber, by various means, of as much as possible of the free water contained therein at any stage of the manufacture.

In the formation of the solid roll of raw rubber as described above the mechanical pressure to which the rubber is subjected has the effect of expressing therefrom a considerable proportion of the free water still remaining in the coagulum at this stage of its treatment. Moreover a certain amount of free water is vaporized from the roll of rubber by the drying action set up when the rollers of the massaging machine are heated, as has been pointed out in the specifications of the aforementioned patents.

It has been found that at this stage almost all the remaining proportions of the free or uncombined water can be extracted from the coagulum by means of the new method of further mechanically dehydrating it which, as hereinafter described, consists in rolling and elongating under pressure the mass to be treated, to the limit, or not, of the elongation permitted by the combined action thereon of the three rollers in the massaging or kneading machine, and then finally enveloping the rolled mass, and while still under full pressure, with a tight wrapping of a material which is substantially inextensible under any ordinary tensile stress and at the same time adapted to readily absorb the moisture which gradually oozes from the roll during, as well as after, the pressure of the three rollers is released when the elongated bar then endeavours to contract in length and increase in diameter, which is entirely prevented when the wrapping is complete and the terminal end thereof duly secured, after which the enveloped roll is preferably hung up by one end in an ordinarily well ventilated room for a few days or for any desired length of time during which time it has a tendency to somewhat further elongate and the remnant of moisture therein contained gradually oozes out therefrom into the wrapping, which on drying by evaporation contracts and further compresses the mass, whereby the dehydrating treatment is not only maintained but intensified until the mass contains practically no free water at all in it as can be demonstrated by subjecting a piece of the roll to hydraulic pressure up to as much as 5 or more tons per square inch when it will be found that even at this enormous pressure no moisture whatever can be expelled from the piece of roll thus tested.

In the preferred way of carrying out the present invention a strip of strongly woven cotton tape or the like webbing of a sufficient length is employed, (which will be referred to herein as the wrapping strip). To one end of this wrapping strip a fitting is secured in the form of a buckle which has been specially designed to enable the same to automatically attach its fed-in end to, and carry round on one end of, the roll of raw rubber to be treated, while same is at its maximum elongation, and under pressure between the three rollers of the massaging machine, for the purpose of effectively carrying out this invention.

The accompanying drawings illustrate the form of this buckle, and how it may be attached to the end of the wrapping strip, and also how it feeds in and attaches itself to the roll of rubber while same is under compression between the three rotating rollers of the massage machine.

Figure 2:
Figure 3:
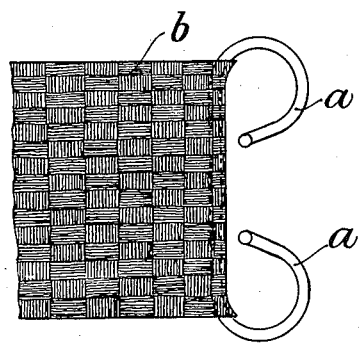

Referring now to the said drawings, Figs. 1, 2, and 3 are respectively a front elevation, a side elevation, and plan of the buckle which is shown attached to the end of wrapping strip.

Figure 4:
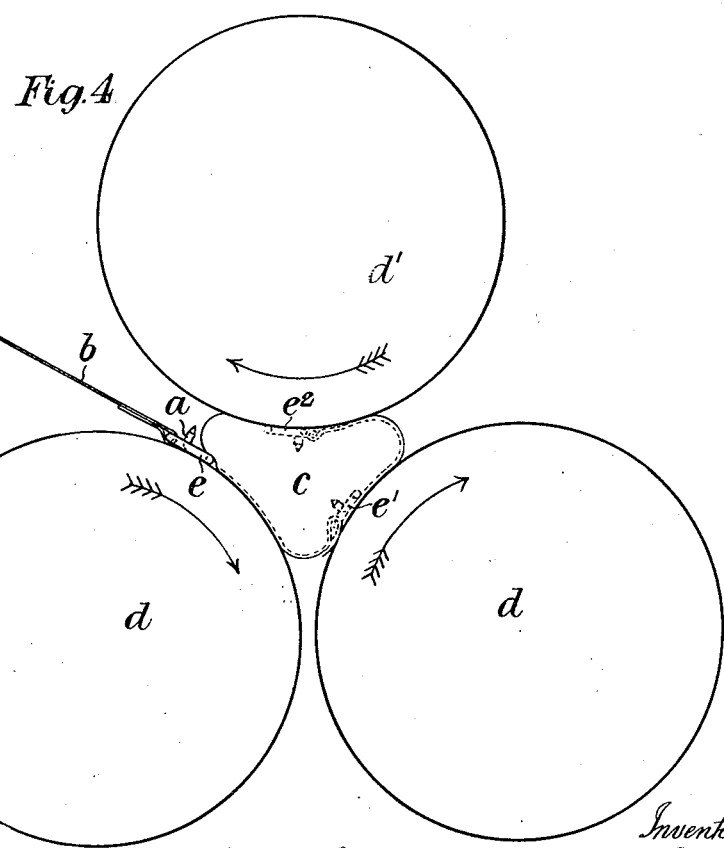
Figure 5:
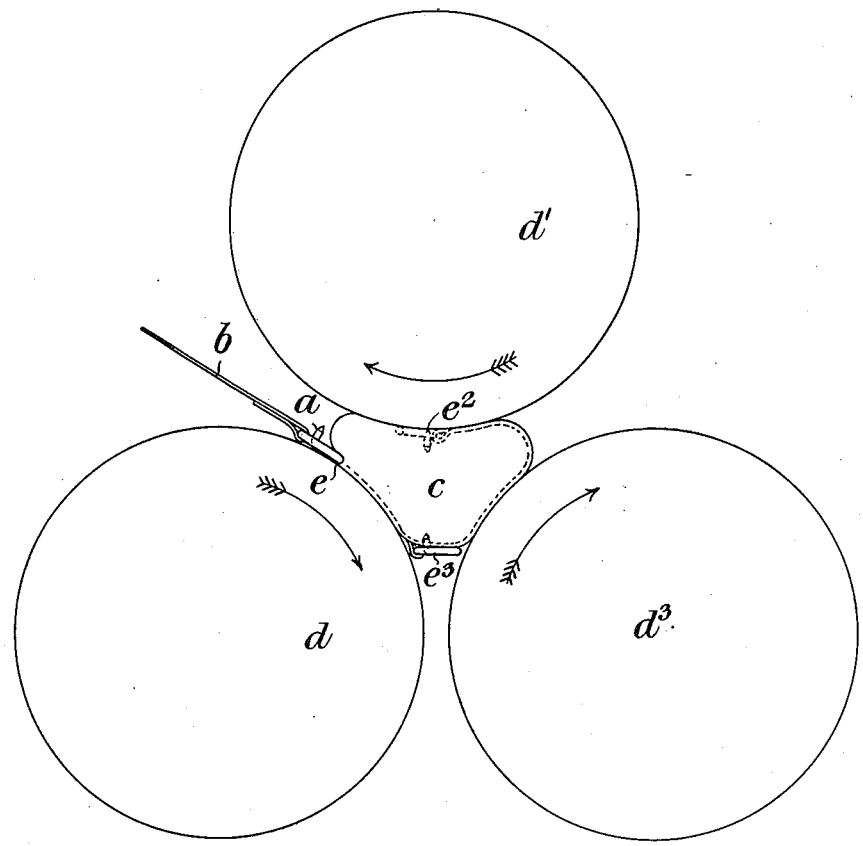

Figures 4 and 5 are side elevations illustrating method of rolling the mass of rubber and wrapping it while under pressure.

The buckle $a$ may be formed from a single piece of wire with sharp pointed ends, the extremities of which are turned upwards parallel to one another, and while a central portion of the first intermediate length is kept straight, the continuation at each side thereof, up to the turned up points, is then bent round until these nearly touch the straight part of the central portion of the wire, thus forming two flat bends in the same plane, with the two spike-like ends pointing upwards at right angles to this plane, and the bent round part projecting in front of them to a sufficient extent to allow these projections to enter, and be held firmly, between one of the two lower rollers of the massage machine and the rotating roll of rubber under compression before the sharp points of the buckle come into direct contact with the rubber, which on touching the rubber are then forced into it their full length, and carry the end of the wrapper attached thereto completely around the roll, so that the further in-feed of the wrapper then laps over the buckle which, when thus secured, permits of the wrapper being fed in at an angle whereby it enfolds the roll all the way up to its opposite end, whereat on the feeding in angle being reversed the wrapper travels back, over the already applied layer thereof, to the starting end.

The pressure of the massage rollers can then be released, and as the roll of rubber after being thus enveloped within the wrapper, has then no tendency to contract, it can now be withdrawn, and the free end of the wrapper secured to it in any convenient way, after which the roll is preferably hung up in an airy room for a few days, during which time the wrapper becomes so thoroughly dry that the wrapper may be unwound without the roll of rubber having now any tendency to contract in length, as it is then also tightly compressed and is entirely free of any uncombined water. The wrapper itself can now be used again on a fresh roll of rubber.

The buckle is attached to one end of a wrapping strap $b$ in the manner shewn in Figs. 1, 2, and 3, the end of the wrapping strip being threaded through the buckle and sewn on so that the straight part of the buckle can turn like a hinge within the sewn on end of the wrapping strip.

Fig. 4 indicates a piece of raw rubber $c$ shewing the three-cornered shape it assumes when under compression between the three rotated rollers $d$ $d'$ and $d^2$ of the massaging machine, $e$ indicating the position of buckle $a$ on the end of wrapping strip $b$, just at the moment of engagement of the projecting bends of the buckle between the rotating roller $d$ and the piece of raw rubber $c$, and also indicates in dotted lines at $e'$ and $e^2$ how the buckle is firmly held in position on the surface of the rubber on its way round to the starting point at $e$.

Referring now to Figure 5, it is pointed out that the only difference between this figure and Figure 4 consists in the fact that in Figure 5 the buckle $a$ is shown in a fresh position $e^3$ between the two rollers $d$, $d^2$ in which the buckle depends upon the engagement of the inwardly projecting spikes with the piece of raw rubber $c$ for maintaining its attachment to the latter. Thus the use and advantage of the said spikes will be clearly appreciated from this figure.

It will, of course, be understood that in carrying out the invention any suitable device may be used in place of the particular form of buckle and (or) wrapping strip which are described above and illustrated in the accompanying drawings and any such substitute device or devices capable of acting in the manner hereinabove described will be regarded as included within the scope of this invention which, broadly, constitutes what is believed to be an entirely new and important step of treatment for effecting the complete dehydration of free or uncombined water from the raw rubber by mechanical means, a problem which has hitherto always presented a great difficulty to the manufacturers of raw rubber.

What is claimed is:—

1. The method of mechanically dehydrating raw rubber and the like plastic substances, which consists in rolling and elongating under pressure the mass to be treated, tightly enveloping the rolled mass while still under pressure with a wrapping practically inextensible under any ordinary tensile stress but adapted readily to absorb moisture, securing the wrapping when complete, and then leaving the mass thus compressed in its wrapping for any desired length of time, preferably in a dry atmosphere, free to further elongate under the gradual transfer of water therefrom into the wrapping which on drying contracts and further compresses the mass, whereby the dehydrating treatment is continuously maintained until the wrapper itself is dry when the contained roll of rubber is then quite denuded of all of its free water.

2. Means for the dehydrating treatment of a plastic substance by continuous compression applied in a machine provided with pressure rollers, comprising a wrapping strip made of a suitable textile material not easily extensible under ordinary tensile stresses but readily absorbing moisture, and a device fixed to one end of the wrapping strip for automatically securing the said end to the roll of the plastic substance in the machine under the pressure applied to the roll and the strip thereon caused by the continued operation of the machine, resulting in the roll of the substance being tightly enclosed in an inextensible casing formed by the said strip.

3. Means for the dehydrating treatment of a plastic substance, comprising pressure rolls adapted to press and roll the plastic substance in the shape of a roll, a wrapping strip of a textile material not easily extensible under ordinary tensile stresses and readily absorbing water, said wrapping strip adapted to be wound around the compressed roll of plastic material by said pressure rolls, and means on the end of said wrapping strip adapted to be automatically secured to said roll of plastic material by the pressure of said pressure rolls during the action of said pressure rolls in rolling and pressing said roll of plastic material, whereby the roll of said plastic substance is tightly enclosed in an inextensible casing formed by said strip.

In testimony whereof we have signed our names to this specification.

FREDERICK GEORGE MAGUIRE,
ALFRED AGAR,
HUGH TAYLOR COULTER,
*Executors of Samuel Cleland Davidson, deceased.*